(12) United States Patent
Stallmann et al.

(10) Patent No.: US 9,879,857 B2
(45) Date of Patent: Jan. 30, 2018

(54) COMBUSTION AND FLUE GAS TREATMENT SYSTEM AND $SO_x$ REMOVAL UNIT

(71) Applicant: ALSTOM Technology Ltd, Baden (CH)

(72) Inventors: Olaf Stallmann, Essenheim (DE); Wuyin Wang, Växjö (SE); Erik W. Böös, Vederslöv (SE)

(73) Assignee: General Electric Technology GmbH, Baden (CH)

( * ) Notice: Subject to any disclaimer, the term of this patent is extended or adjusted under 35 U.S.C. 154(b) by 147 days.

(21) Appl. No.: 14/814,908

(22) Filed: Jul. 31, 2015

(65) Prior Publication Data

US 2016/0053996 A1 Feb. 25, 2016

(30) Foreign Application Priority Data

Aug. 21, 2014 (EP) ..................... 14181735

(51) Int. Cl.
*B01D 53/02* (2006.01)
*F23J 15/02* (2006.01)
(Continued)

(52) U.S. Cl.
CPC ............ *F23J 15/022* (2013.01); *B01D 53/50* (2013.01); *B01D 53/508* (2013.01); *B01D 53/75* (2013.01);
(Continued)

(58) Field of Classification Search
CPC ........ B01D 2251/404; B01D 2257/302; B01D 2257/402; B01D 2257/404;
(Continued)

(56) References Cited

U.S. PATENT DOCUMENTS 5,082,586 A * 1/1992 Hooper ................. B01D 53/60
  252/184
5,647,892 A * 7/1997 McKenna ............. B01D 53/08
  422/171
(Continued)

FOREIGN PATENT DOCUMENTS

AT    400004 B       9/1995
DE    102008062495 A1  6/2010

OTHER PUBLICATIONS

Translation of DE102008062495, Jun. 2010.*

*Primary Examiner* — Christopher P Jones
(74) *Attorney, Agent, or Firm* — GE Global Patent Operation; Cynthia W. Flanigan

(57) ABSTRACT

The combustion and flue gas treatment system includes a furnace for combusting a fuel with an oxidizer generating a flue gas, ducting for the flue gas connected to a $NO_x$ removal unit and a $SO_x$ removal unit, and a recirculation line for recirculating a part of the flue gas back to the furnace. The $SO_x$ removal unit is located upstream of the $NO_x$ removal unit with reference to the flue gas flow. The recirculation line is connected to the ducting downstream the $SO_x$ removal unit.

9 Claims, 2 Drawing Sheets

(51) Int. Cl.
  *B01D 53/75* (2006.01)
  *B01D 53/83* (2006.01)
  *B01D 53/86* (2006.01)
  *F23J 15/00* (2006.01)
  *B01D 53/50* (2006.01)
  *F22D 1/02* (2006.01)
  *F23J 15/04* (2006.01)

(52) U.S. Cl.
  CPC .......... *B01D 53/83* (2013.01); *B01D 53/869* (2013.01); *B01D 53/8625* (2013.01); *F22D 1/02* (2013.01); *F23J 15/006* (2013.01); *F23J 15/04* (2013.01); *B01D 2251/404* (2013.01); *B01D 2257/302* (2013.01); *B01D 2257/402* (2013.01); *B01D 2257/404* (2013.01); *B01D 2258/0283* (2013.01); *B01D 2259/128* (2013.01); *F23J 2215/10* (2013.01); *F23J 2215/20* (2013.01); *F23J 2219/40* (2013.01); *F23J 2219/60* (2013.01); *Y02C 20/10* (2013.01)

(58) Field of Classification Search
  CPC ...... B01D 2258/0283; B01D 2259/128; B01D 53/50; B01D 53/508; B01D 53/75; B01D 53/83; B01D 53/8625; B01D 53/869; F22D 1/02; F23J 15/006; F23J 15/022; F23J 15/04; F23J 2215/10; F23J 2215/20; F23J 2219/40; F23J 2219/60; Y02C 20/10
  See application file for complete search history.

(56) References Cited

U.S. PATENT DOCUMENTS

| | | | |
|---|---|---|---|
| 6,379,639 B2 * | 4/2002 | Dohmann | B01D 53/75 110/345 |
| 2002/0179493 A1 * | 12/2002 | Etter | C10B 55/00 208/131 |
| 2005/0233274 A1 | 10/2005 | Marin et al. | |
| 2010/0206202 A1 * | 8/2010 | Darde | B01D 53/04 110/204 |
| 2014/0338531 A1 * | 11/2014 | Gayheart | B01D 53/83 95/108 |
| 2015/0139882 A1 * | 5/2015 | Warren | B01D 53/508 423/244.07 |

* cited by examiner

COMBUSTION AND FLUE GAS TREATMENT SYSTEM AND $SO_x$ REMOVAL UNIT

CROSS-REFERENCE TO RELATED APPLICATIONS

This application claims priority to EP Application No. 14181735.3 filed Aug. 21, 2014, the contents of which are hereby incorporated in its entirety.

TECHNICAL FIELD

The present invention relates to a combustion and flue gas treatment system and a $SO_x$ removal unit.

The system can for example be part of a power plant or an industrial plant; any example of system is anyhow possible.

BACKGROUND

FIG. 1 shows a combustion and flue gas treatment systems such as those systems commonly used in power plants; the system 1 has a furnace 2 (for example being part of a boiler) where a fuel is combusted with an oxidizer, for example oxygen or air enriched oxygen.

The flue gas produced in the furnace 2 is forwarded to a $NO_x$ removal unit 3, such as a SCR, where the flue gas is washed in counter current against water containing a reagent for $NO_x$ removal. The flue gas is then passed through a heat exchanger 4 where it is cooled, and is then forwarded to a dust removal unit 5, such as filters or electrostatic precipitators.

The cooled flue gas deprived from $NO_x$ and dust is then passed through a $SO_x$ removal unit 6, where the flue gas is washed again against a reagent for $SO_x$ removal (possibly contained in a slurry) at a flue gas temperature of about 120° C. The flue gas also deprived from $SO_x$ is thus forwarded to a direct contact cooler 7 such as a condenser, where water is condensed and removed from the flue gas. The pre-treated flue gas is thus forwarded to a gas processing unit or CPU 8 where carbon dioxide is separated from the other gas of the flue gas. Carbon dioxide is thus forwarded via a line 9 to storage or further treatments or use; the other gas is forwarded to the stack 10 for being vented to the atmosphere.

In addition, in order to increase the carbon dioxide content of the flue gas, a part of the flue gas is recirculated back into the furnace 2. In this respect, the system 1 has a recirculation line 11 that departs from downstream the $SO_x$ removal unit 6, for example upstream or downstream the direct contact cooler 7.

The recirculation line 11 is connected with the heat exchanger 4, such that the recirculated flue gas (actually partly clean flue gas) is heated and the flue gas directed into the dust removal unit 5 is cooled.

This traditional design has some disadvantages.

In fact, at the heat exchanger 4 oxygen slip (i.e. oxygen passage into the flue gas) can occur; this is disadvantageous because oxygen contaminates the flue gas and must be removed in order to obtain high purity carbon dioxide from the flue gas.

In addition, since the $NO_x$ removal unit 3 is immediately downstream of the furnace 2, deactivation of the catalyzer typically occurs.

SUMMARY

An aspect of the invention includes providing a combustion and flue as treatment system and a $SO_x$ removal unit that prevent or limit contamination of the flue gas by oxygen.

Another aspect of the invention includes providing a combustion and flue as treatment system and a $SO_x$ removal unit by which deactivation of the catalyser is counteracted.

These and further aspects are attained by providing a combustion and flue gas treatment system and a $SO_x$ removal unit in accordance with the accompanying claims.

Advantageously, the system is thermodynamically optimized, because the flue gas is not cooled and then reheated in order to be recirculated back into the furnace.

BRIEF DESCRIPTION OF THE DRAWINGS

Further characteristics and advantages will be more apparent from the description of a preferred but non-exclusive embodiment of the system and device, illustrated by way of non-limiting example in the accompanying drawings, in which.

DETAILED DESCRIPTION

Figure 1:
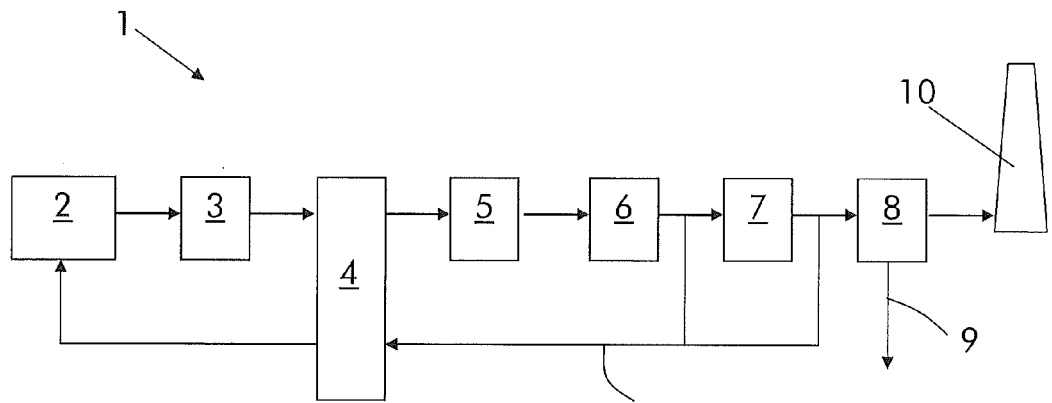
FIG. 1 shows a combustion and flue gas treatment system of the prior art.

With reference to the figures, these show a combustion and flue gas treatment system 1 comprising a furnace 2 (for example part of a boiler) for combusting a fuel with an oxidizer generating a flue gas.

The fuel can in different examples be a gas, liquid or solid fuel, but preferably the fuel is a solid fuel such as coal, lignite, etc; the oxidizer can also be any, but preferably it is pure or substantially pure oxygen or air enriched oxygen. The pure or substantially pure oxygen can be pre-heated before being supplied into the furnace 2.

The system 1 further has ducting 15 for conveying the flue gas among the different units that carry out different treatments. In particular, the ducting 15 is connected to the $NO_x$ removal unit 3 and $SO_x$ removal unit 6, with the $SO_x$ removal unit 6 located upstream of the $NO_x$ removal unit 3 with reference to the flue gas flow. For example, the $SO_x$ removal efficiency of the $SO_x$ removal unit 6 is over 60% and preferably over 80%.

The system further comprises the recirculation line 11 for recirculating a part of the flue gas back to the furnace 2; the recirculation line 11 is connected downstream of the $SO_x$ removal unit 6. For example the recirculation line 11 can be connected to the ducting 15 at a position downstream the $SO_x$ removal unit 6 (like in the attached FIGS. 2 and 3) or it is also possible that the recirculation line is connected to the $SO_x$ removal unit at a position downstream thereof or it can be connected to the $NO_x$ removal unit 3 at a position upstream thereof.

With this configuration no heat exchanger like the heat exchanger 4 of the prior art is needed, such that no oxygen slip into the flue gas occurs at the heat exchanger. In addition, since the flue gas is treated at the $SO_x$ removal unit 6 before entering the $NO_x$ removal unit 3, no or a reduced catalyst deactivation occurs at the $NO_x$ removal unit 3. Further, the recirculation between the $SO_x$ removal unit 6 and the $NO_x$ removal unit 3 allows recirculation of the flue gas before its temperature is dropped at the $NO_x$ removal unit 3.

The dust removal unit 5 such as a filter or electrostatic precipitator is located upstream the $NO_x$ removal unit 3; this further helps providing the $NO_x$ removal unit with clean gas, preventing or counteracting a possible catalyst deactivation.

In a first example (FIG. 2), the dust removal unit 5 is located upstream the $SO_x$ removal unit 6. In this example the dust removal unit 5 is located between the furnace 2 and the $SO_x$ removal unit 6. The dust removal unit 5 upstream the $SO_x$ removal unit 6 advantageously allows gathering of fly ash without contamination by the end products at the $SO_x$ removal unit.

In a second example (FIG. 3), the dust removal unit 5 is located downstream the $SO_x$ removal unit 6 and upstream the $NO_x$ removal unit 3. In this example the dust removal unit 5 is located between the $SO_x$ removal unit 6 and $NO_x$ removal unit 3; the connection 16 of the recirculation line 11 to the ducting 15 is preferably located downstream the dust removal unit 5; it is clear that the connection 16 of the recirculation line 11 to the ducting 15 can also be upstream the dust removal unit 5 with reference to the flue gas flow. The dust removal unit 5 downstream the $SO_x$ removal unit 6 advantageously allows gathering of flying ash and $CaSO_3$ and/or $CaSO_4$ at the dust removal unit 5 (that can for example include filters).

Figure 2:
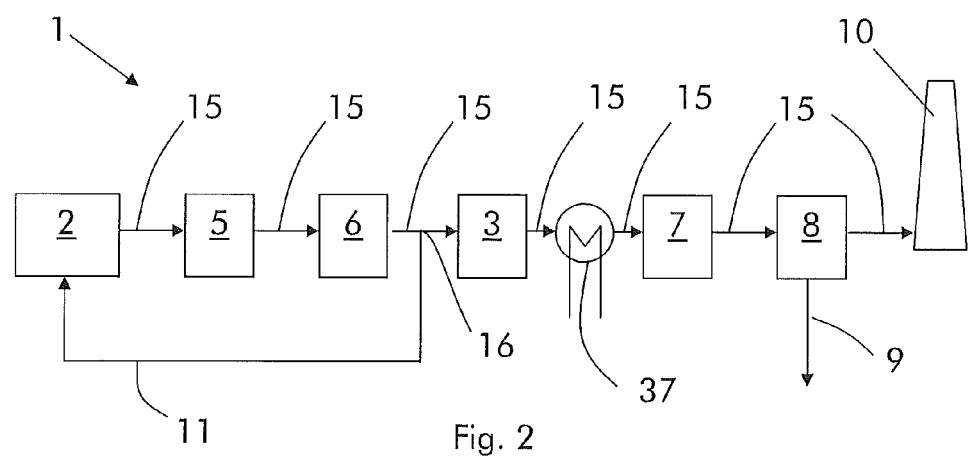
FIGS. 2 and 3 show combustion and flue gas treatment systems in different embodiments of the invention.

An economizer (i.e. a heat exchanger that heats the water supplied into the boiler against the flue gas) could also be provided; in this case the $SO_x$ removal unit 6 is preferably located downstream of the economizer. With reference to FIG. 2, in case the economizer is provided, it can for example be located between the furnace 2 and the dust removal unit 5 or between the dust removal unit 5 and the $SO_x$ removal unit 6.

In addition, a heat exchanger 37 can be provided for cooling the flue gas against a cooling medium (for example water or ambient air or other); in this case the $SO_x$ removal unit 6 in preferably provided upstream of the heat exchanger 37.

The $SO_x$ removal unit 6 is a moderate temperature $SO_x$ removal unit able to work up to a temperature of 500° C. and preferably in a temperature range between 250-400° C. preferably 350-400° C.

The $SO_x$ removal unit 6 comprises a vessel 20 with an inlet 21 for a flue gas and an outlet 22 for a treated flue gas.

In addition, the $SO_x$ removal unit 6 comprises a pulverized reagent supply 27 for a reagent.

The pulverized reagent supply 27 comprises a manifold with a plurality of nozzles 29. The manifold 28 is connected to a reservoir 30 and a carrier gas supply 31, such as piping with or without a fan, for recirculating a part of the treated flue gas moving out from the vessel 20 via the outlet 22.

In a different example, the $SO_x$ removal unit 6 comprises a vessel 20 with an inlet 21 for a flue gas and an outlet 22 for a treated flue gas. The vessel 20 further houses a reagent bed 35 and the inlet 21 and the outlet 22 are located at opposite sides of the vessel 20 with respect to the bed 35. The reagent bed 35 is advantageously a fluidized bed (i.e. it is preferably not a fixed bed).

Preferably the inlet 21 is at the lower part of the vessel 20 and the outlet 22 is at the upper part of the vessel 20.

Figure 3:
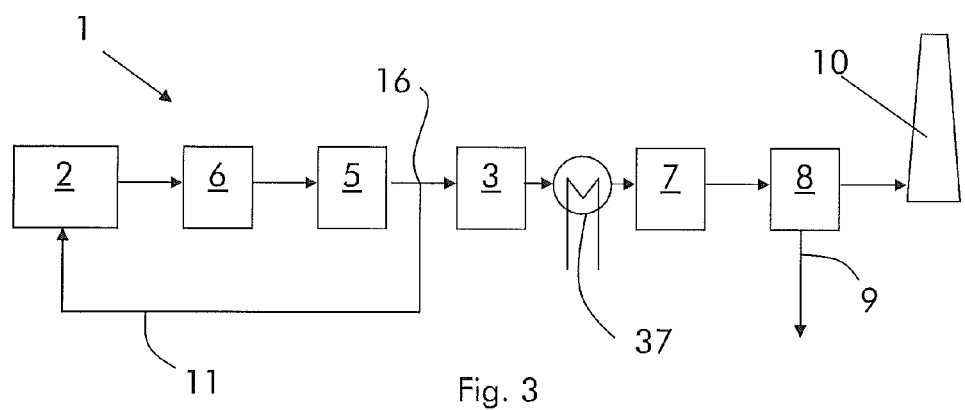

The operation of the system and $SO_x$ removal unit is apparent from that described and illustrated and is substantially the following; in the following reference to the embodiment of FIG. 2 is made, the operation of the embodiment of FIG. 3 is similar.

At the furnace 2 fuel is combusted with an oxidizer; the furnace 2 is preferably an oxy combusted furnace, i.e. fuel such as coal is combusted with pure or substantially pure oxygen or air enriched oxygen.

Flue gas generated at the furnace 2 is supplied to the dust removal unit 5, where dust is removed, and then to the $SO_x$ removal unit 6.

The flue gas moving out of the furnace 2 can have a temperature of about 250-400° C. preferably 350-400° C.; no sensible temperature drop occurs at the dust removal unit 5 such that at the inlet 21 of the $SO_x$ removal unit 6 the flue gas can have a temperature of about 250-400° C. preferably 350-400° C.

At the $SO_x$ removal unit 6 reagent is supplied and $SO_x$ is removed (as explained in detail in the following); the gas moving out of the $SO_x$ removal unit 6 is thus flue gas deprived of $SO_x$; no sensible temperature drop occurs at the $SO_x$ removal unit 6, such that the temperature of the flue gas moving out of the $SO_x$ removal unit is about 250-400° C. preferably 350-400° C.

Downstream the $SO_x$ removal unit 6 a part of the flue gas deprived from $SO_x$ is recirculated back to the furnace 2 via the connection 16 and recirculation line 11; since this gas has a temperature of about 250-400° C. preferably 350-400° C. (i.e. about the temperature of the flue gas moving out of the furnace 2) no preheating against the flue gas moving out of the furnace 2 is needed.

The part of the flue gas deprived from $SO_x$ that is not recirculated back into the furnace 2 is forwarded to the $NO_x$ removal unit 3, where it is washed against water and a reagent and made to contact a catalyst, in order to remove $NO_x$.

The flue gas deprived from $SO_x$ and $NO_x$ is then passed through the condenser 7 for water removal (possibly after cooling in the heat exchanger 37) and is then provided to the GPU 8 where it is compressed and condensed, typically a number of times, in order to separate by condensation carbon dioxide $CO_2$ from other non-condensable gas. Carbon dioxide is thus forwarded to storage or further treatments or other use via the line 9 and the non-condensable gas (nitrogen, argon, etc.) is discharged to the atmosphere via the stack 10.

With particular reference to the operation of the $SO_x$ removal unit 6, it contacts the flue gas with pulverized and substantially dry reagent at a temperature between 250-400° C. preferably 350-400° C. The reagent can be lime (CaO), hydrate lime (calcium hydroxide, $Ca(OH)_2$), limestone ($CaCO_3$), or other reagents used in the art.

Figure 4:
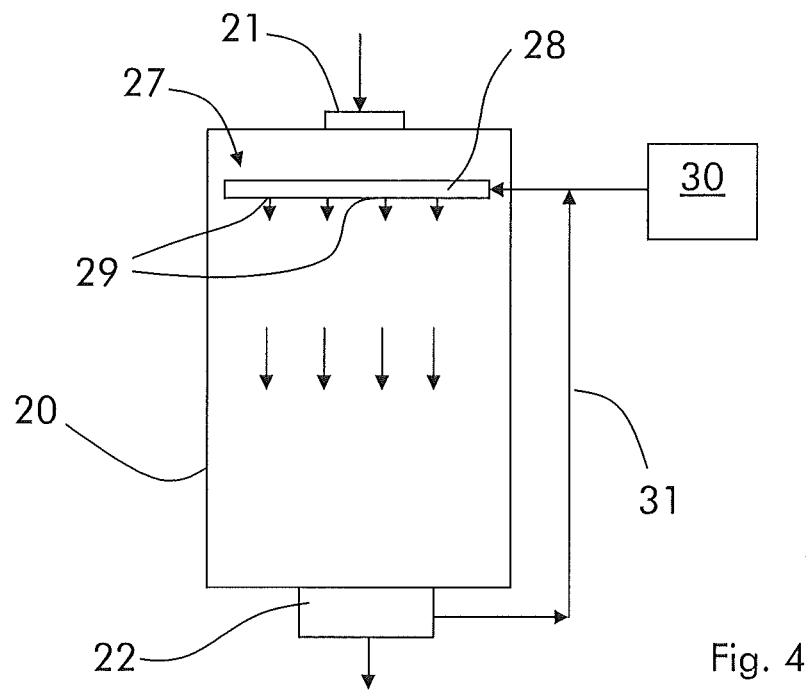
FIGS. 4 and 5 show different embodiments of a $SO_x$ removal unit.

With reference to the embodiment of FIG. 4 and the use of lime CaO and hydrated lime $Ca(OH)_2$ as the reagent, lime and hydrated lime are supplied together with recirculated flue gas deprived from $SO_x$ into the manifold 28 and injected via the nozzles 29 into the vessel 20.

In the vessel 20 the pulverized lime CaO and hydrated lime $Ca(OH)_2$ contact the flue gas containing $SO_x$ that passes through the vessel 20, causing the reactions $$SO_2 + CaO \rightarrow CaSO_3$$

$$SO_2 + Ca(OH)_2 \rightarrow CaSO_3 \cdot \tfrac{1}{2}H_2O + \tfrac{1}{2}H_2O$$

$$SO_3 + CaO \rightarrow CaSO_4$$

$$SO_3 + Ca(OH)_2 \rightarrow CaSO_4 + H_2O.$$

Figure 5:
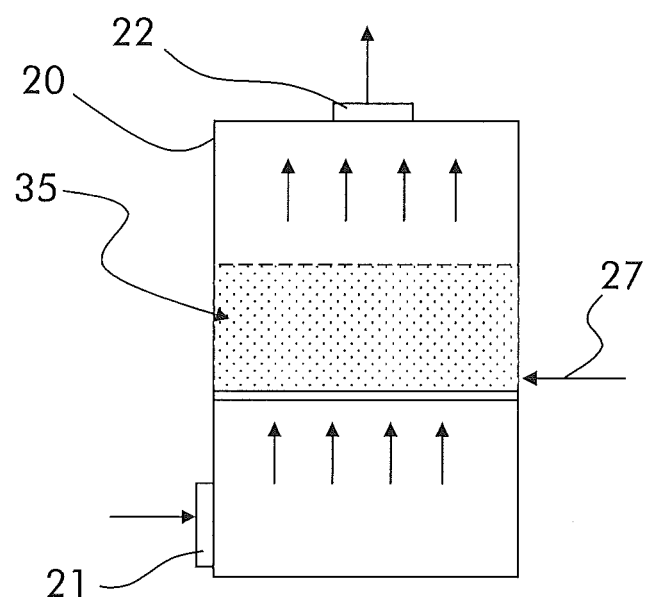

With reference to the embodiment of FIG. 5 and the use of lime CaO and hydrated lime $Ca(OH)_2$ as the reagent, pulverized lime and hydrated lime are contained in the bed 35.

The flue gas entering via the inlet 21 passes through the bed 35 causing the reactions $$SO_2 + CaO \rightarrow CaSO_3$$

$$SO_2+Ca(OH)_2 \rightarrow CaSO_3 \cdot \tfrac{1}{2}H_2O+\tfrac{1}{2}H_2O$$

$$SO_3+CaO \rightarrow CaSO_4$$

$$SO_3+Ca(OH)_2 \rightarrow CaSO_4+H_2O.$$

Also in this embodiment, a pulverized reagent supply 27 is preferably provided, to supplement reagent to the bed 35.

The spent sorbent from the $SO_x$ removal unit 6 can for example be used at the direct contact cooler 7.

Naturally the features described may be independently provided from one another.

In practice the materials used and the dimensions can be chosen at will according to requirements and to the state of the art.

The invention claimed is:

1. A combustion and flue gas treatment system comprising a furnace for combusting a fuel with an oxidizer generating a flue gas, ducting for the flue gas connected to a $NO_x$ removal unit and a $SO_x$ removal unit, a recirculation line for recirculating a part of the flue gas back to the furnace, wherein the $SO_x$ removal unit is located upstream of the $NO_x$ removal unit with reference to the flue gas flow, and in that the recirculation line is connected to the ducting downstream the $SO_x$ removal unit, and wherein the combustion and flue gas treatment system comprises a dust removal unit, the dust removal unit located downstream of the $SO_x$ removal unit and upstream of the $NO_x$ removal unit.

2. The system of claim 1, wherein the dust removal unit is located upstream of a recirculation line connection to the ducting.

3. The system of claim 1, wherein the $SO_X$ removal unit comprises a vessel with an inlet for a flue gas and an outlet for a treated flue gas, and further comprising a pulverized reagent supply for a reagent.

4. The system of claim 3, wherein the pulverized reagent supply comprises a manifold with a plurality of nozzles.

5. The system of claim 3, wherein the pulverized reagent supply comprises a reagent reservoir and a carrier gas supply.

6. The system of claim 1, wherein the $SO_X$ removal unit comprises a vessel with an inlet for a flue gas and an outlet for a treated flue gas, wherein the vessel houses a reagent bed, wherein the inlet and the outlet are located at opposite sides of the vessel with respect to the bed.

7. The system of claim 6, wherein the inlet is at the lower part of the vessel and the outlet is at the upper part of the vessel.

8. The system of claim 1, wherein the furnace is part of a boiler, wherein the system comprises an economizer for heating water supplied to the boiler and a heat exchanger for cooling the flue gas, wherein the $SO_x$ removal unit is located downstream of the economizer and upstream of the heat exchanger.

9. The $SO_X$ removal unit of claim 3, wherein the reagent bed is a fluidized bed.

* * * * *